(12) United States Patent
Fujino

(10) Patent No.: US 9,610,575 B2
(45) Date of Patent: Apr. 4, 2017

(54) POROUS CATALYTIC SUBSTRATE

(75) Inventor: Shigeru Fujino, Kasuga (JP)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 129 days.

(21) Appl. No.: 13/880,034

(22) PCT Filed: Aug. 16, 2012

(86) PCT No.: PCT/US2012/051078
§ 371 (c)(1),
(2), (4) Date: Apr. 17, 2013

(87) PCT Pub. No.: WO2014/028016
PCT Pub. Date: Feb. 20, 2014

(65) Prior Publication Data
US 2014/0193310 A1    Jul. 10, 2014

(51) Int. Cl.
*C03B 19/06* (2006.01)
*B01J 31/26* (2006.01)
*B01J 35/10* (2006.01)
*B01J 23/06* (2006.01)
*B01J 23/40* (2006.01)
*B01J 23/48* (2006.01)
*B01J 23/72* (2006.01)
*B01J 37/08* (2006.01)
(Continued)

(52) U.S. Cl.
CPC .............. *B01J 31/26* (2013.01); *B01J 23/06* (2013.01); *B01J 23/40* (2013.01); *B01J 23/48* (2013.01); *B01J 23/72* (2013.01); *B01J 35/10* (2013.01); *B01J 35/1052* (2013.01); *C03B 19/066* (2013.01); *B01J 35/1057* (2013.01); *B01J 35/1061* (2013.01); *B01J 35/1066* (2013.01); *B01J 37/0018* (2013.01); *B01J 37/0203* (2013.01); *B01J 37/0207* (2013.01); *B01J 37/08* (2013.01)

(58) Field of Classification Search
CPC ..... B01J 31/26; B01J 35/1052; C03B 19/066; B01L 3/502753
USPC ................. 422/502–503, 527, 536, 551–553
See application file for complete search history.

(56) References Cited

U.S. PATENT DOCUMENTS 5,409,609 A * 4/1995 Soria et al. ............... 210/321.72
6,572,830 B1 * 6/2003 Burdon et al. ........... 422/186.29
(Continued)

FOREIGN PATENT DOCUMENTS

WO     WO 2011/004852        1/2011

OTHER PUBLICATIONS

Application by DNP and Tohoku University Irelating to microreactor, (JP2008-82592), applicant Dai Nippon printing co., Ltd and National University Corporation Tohoku University. information was available at http://www.ekouhou.net, in some form no later than Sep. 27, 2011.
JST; Glass microchip on which microcapsuled palladium catalyst is fixed information was available at http://www.jst.go.jp/pr/info/info72/index.html, in some form no later than Sep. 27, 2011.
Microreactor catalog,information was available at http://www.sibata,co.jp/pickup/img/mikro/mikroreactor.pdf in some form no later than Sep. 27, 2011.
(Continued)

*Primary Examiner* — Brian R Gordon
(74) *Attorney, Agent, or Firm* — Dorsey & Whitney LLP

(57) ABSTRACT
Some embodiments in the present disclosure generally relate to catalytic silica-polyvinyl alcohol composites, silica structures therefrom, and/or microreactors therefrom. Some embodiments in the present disclosure generally relate to porous substrates that can have at least one pore with a catalyst associated with the inside of the pore.

12 Claims, 5 Drawing Sheets

(51) Int. Cl.
*B01J 37/00* (2006.01)
*B01J 37/02* (2006.01)

(56) References Cited

U.S. PATENT DOCUMENTS

| | | |
|---|---|---|
| 7,547,430 B2 | 6/2009 | Sethi et al. |
| 2005/0032204 A1 | 2/2005 | Rodgers et al. |
| 2005/0047985 A1 | 3/2005 | Mori et al. |
| 2005/0170142 A1* | 8/2005 | Remy .................. 428/141 |
| 2006/0057450 A1 | 3/2006 | Morse et al. |
| 2007/0225532 A1* | 9/2007 | Tonkovich et al. .......... 585/444 |
| 2008/0108122 A1 | 5/2008 | Paul et al. |
| 2008/0138273 A1 | 6/2008 | Jiang |
| 2009/0233790 A1* | 9/2009 | Vajda et al. ............... 502/334 |
| 2009/0250379 A1 | 10/2009 | Kurtz et al. |
| 2010/0314295 A1* | 12/2010 | Sandstede et al. ........... 208/143 |
| 2012/0107589 A1 | 5/2012 | Fujino et al. |

OTHER PUBLICATIONS

AIST's application relating to microreator ( Fabrication method, etc. are also described), informatiion was available at http://www.aist.go.jp/aist-idea/cgi-bin/detail_data.cgi?kind=1&seg=11309, in some form no later than Sep. 27, 2011.

Okayama, list of microreactor prototypes, information was available at, http://www.kasen.co.jp/product/precision/imq/seika.pdf, in some form no later than Sep. 27, 2011.

Ikeda et al, "Fabrication of micropatterns on silica glass by a room-temperature imprinting method", Journal of American Ceramic Society, (2011).

International Search Report and Written Opinion dated Dec. 11, 2012 in International Application No. PCT/US2012/051078.

Suzuki et al., "Formation of a Compatible Composite of Silica/Poly (vinyl alcohol) through the sol—gel process and a calcinated product of the composite," SpringerLink-Journal of Materials Science, vol. 31, No. 5.

* cited by examiner

POROUS CATALYTIC SUBSTRATE

CROSS-REFERENCE TO RELATED APPLICATION

This application is the U.S. national phase entry under 35 U.S.C. §371 of PCT/US2012/051078, filed on Aug. 16, 2012, the entire disclosure of which is hereby incorporated by reference herein.

TECHNICAL FIELD

Embodiments herein generally relate to porous catalytic substrates and/or microreactors, as well as methods of making such materials and/or devices.

BACKGROUND

Substrates can be used for a variety of purposes, including starting layers in various fabrication processes. Frequently, these substrates can have microfabricated structures built upon or with them. For example, in microreactors, a flow path can be built within and/or upon a substrate, allowing for microscale manipulation of a sample by these microstructures. Traditionally, the final microstructures, such as a flow path, are formed using a combination of photolithography, etching, and/or other techniques.

SUMMARY

Some embodiments provided herein relate to use of silica-polyvinyl alcohol composites that can include a catalytic substances and/or or shaped into a microreactor configuration.

In some embodiments, a microreactor is provided. The microreactor can include a flow path, a sintered silica material which defines the flow path, at least one pore in the sintered silica material, wherein the at least one pore has an average diameter of about 1 nm to about 100 nm, and at least one catalyst within the at least one pore.

In some embodiments, a method of manufacturing a porous catalytic glass is provided. The method can include providing a silicon dioxide-polyvinyl alcohol composite, forming a flow path in the composite, applying a catalyst to the flow path, and heating the silicon dioxide-polyvinyl alcohol composite to yield a porous catalytic glass.

In some embodiments, a method of manufacturing a microreactor is provided. The method can include providing a porous silica composite including an organic/inorganic interface, and molding a microstructure of a microreactor into the composite.

In some embodiments, a silica-polyvinyl alcohol composite is provided. The composite can include at least one silica particle combined with polyvinyl alcohol ("PVA") so as to form a silica-polyvinyl alcohol composite, wherein the composite includes a plurality of pores, and wherein the pores have an average diameter of about 1 nm to about 300 nm. The composite further includes a catalyst, wherein the catalyst is on an outer surface of the silica-polyvinyl alcohol composite.

In some embodiments, a microreactor is provided. The microreactor can include a chamber, a sintered silica material which defines the chamber, at least one pore in the sintered silica material, wherein the at least one pore has an average diameter of about 1 nm to about 100 nm, and at least one catalyst within the at least one pore.

The foregoing is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
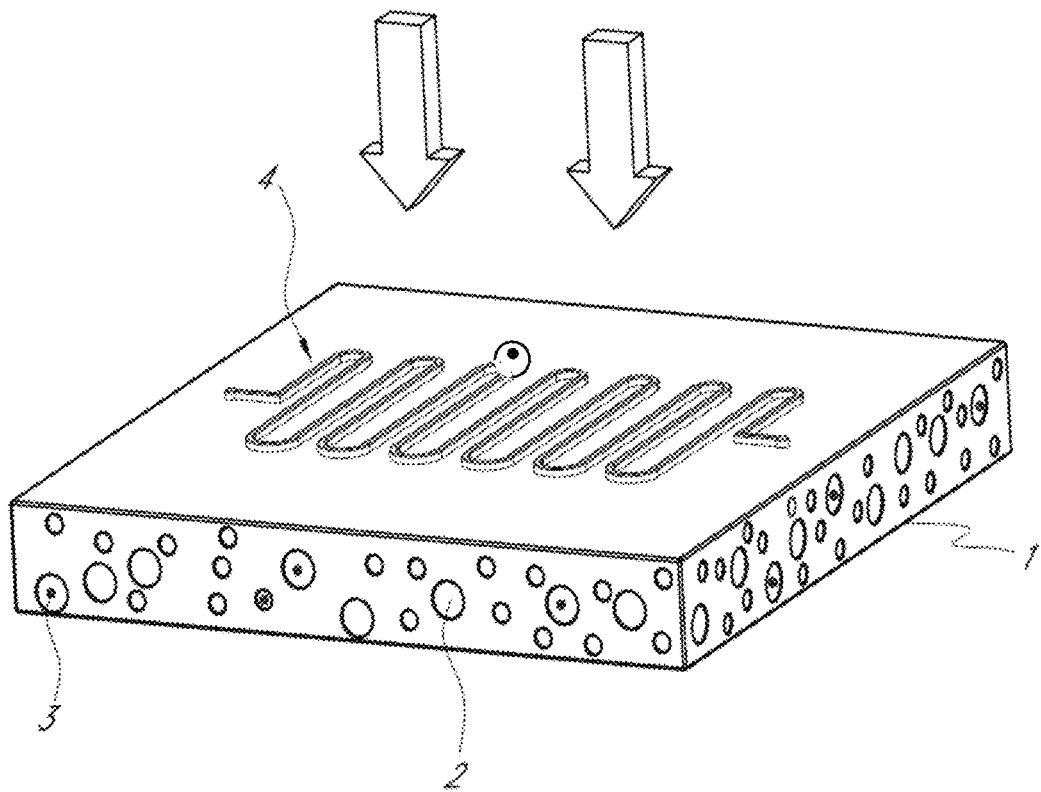
FIG. 1 is a drawing depicting a microreactor in accordance with some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In some embodiments, the methods and apparatuses disclosed herein generally relate to porous catalytic substrates and/or structures. As described in more detail below, a silica-polyvinyl alcohol composites can be used as a precursor for preparing a substrate or microstructure, which can be sintered into a cohesive structure for a variety of purposes (such as a microreactor). In some embodiments, the initial porous nature of the composite allows for the distribution and trapping of various molecules in the composite, such as a catalyst, which can then be present in the final substrate and/or microstructure.

FIG. 1 is a schematic drawing of a silica-polyvinyl alcohol composite in accordance with some of the embodiments provided herein. The composite 1 can include a plurality of pores 2. The pores 2 can have an average diameter of about 1 nm to about 300 nm. As will be appreciated by one of skill in the art, the composite 1, before sintering, is a collection of particles, the space between which form the voids 2, which can be filled with the polyvinyl alcohol (until the polyvinyl alcohol is removed) and/or additional materials such as a catalyst or other material that one may wish to have distributed over a surface of a microdevice. Once the composite 1 is sintered, it can form a single structure which can still include the voids 2, without a meaningful amount of polyvinyl alcohol. Some of the embodiments provided herein use the above noted silica-polyvinyl alcohol composite as a material for microreactors and/or other devices that involve catalytic surfaces and/or sections. Such surfaces and/or section include a catalytic material. While described in greater detail below, this can be achieved by combining a desired catalyst with the composite or a derivative thereof and/or molding the composite into a desired shape. Sintering the composite thus formed allows one to provide a silica structure from the composite, which can have the catalytic molecules associated with the silica.

FIG. 1 also depicts a channel or flow path 4 of a microreactor in accordance with some embodiments. The microreactor can include a channel or flow path 4 in either a silica-polyvinyl alcohol composite (e.g. before drying and/or sintering) or the fused silica product (after sintering). Such a microreactor structure can also include at least one pore 2 that has an average diameter of about 1 nm to about 100 nm. Furthermore, the microreactor can include at least one catalyst 3 within the at least one pore 2. While the catalyst 3 is depicted as being within internal pores in FIG. 1, in some embodiments, the catalyst 3 can be on a surface of the flow path, and thus, be associated with surface and/or pores 2 that are open to the surface of the material. In some embodiments, the microreactor includes a channel or flow path 4, a sintered silica material which defines the flow path, at least one pore 2 in the sintered silica material.

While not explicitly illustrated in FIG. 1, in some embodiments, the catalyst 3 can be associated with the pores on a surface of the composite, thereby allowing for adhesion of a deposited catalytic material on a surface of the composite (and thus the final sintered glass structure), within the flow path 4. For example, in some embodiments, the catalytic molecules can be stamped onto and/or into the flow path 4. In some embodiments, the catalyst can be fixed and/or adsorbed onto surfaces in the pores 2. In some embodiments, the catalyst can include, but is not limited to, at least one of Rh, Pt, Ag, Ir, Au, Cu, and Zn. In some embodiments, the catalyst can include any transition metals. In some embodiments, any type of catalyst can be employed, including organic catalysts. In embodiments in which the catalyst is added before the sintering process, the catalyst can be one that adequately survives the sintering process (for example, does not overly decompose due to the temperature of the sintering process). In some embodiments, a metal compound and/or a metallocyclic compound can be used in the material. In some embodiments, the catalyst is provided in a manner and amount that provides for a continuous layer of the catalyst 3 over part and/or substantially all of the surface of the flow path 4 (FIG. 4B). Thus, while in some embodiments, sections of the flow path 4 can include the catalyst 3, in other embodiments, most and/or a significant portion of the surface of the flow path can have the catalyst on it.

In some embodiments, the microreactor need not include a flow path. In some embodiments, the microreactor includes a chamber, a sintered silica material which defines the chamber, at least one pore in the sintered silica material, wherein the at least one pore has an average diameter of about 1 nm to about 100 nm, and at least one catalyst within the at least one pore. In some embodiments, the chamber can have at least one opening to allow material to enter and/or leave the chamber. In some embodiments, the chamber can be open, sealed, and/or sealable. In some embodiments, the chamber can include more than one opening, such as being linked to one or more flow paths. In some embodiments, the catalyst is present on one or more surfaces of the chamber, such as a bottom and/or one or more walls of the chamber. In some embodiments, the catalyst need not be contained within a chamber, and can instead be part of a surface of the composite and/or sintered material. In some embodiments, one can check ongoing reactions by applying samples to a surface that includes the catalyst, for example by an autosampler.

Prior to sintering, the composite can be a flexible nanocomposite. The composite can have sufficient flexibility and/or malleability and/or ductility to allow for the formation of projections and recesses when a stamp or other molding device is applied against the composite. In some embodiments, the composite is solid enough to maintain a shape or structure when the mold is removed. In some embodiments, a mold can be used on the composite to maintain a shape or structure applied to the composite material, until at least some of the polyvinyl alcohol is removed.

Figure 4A:
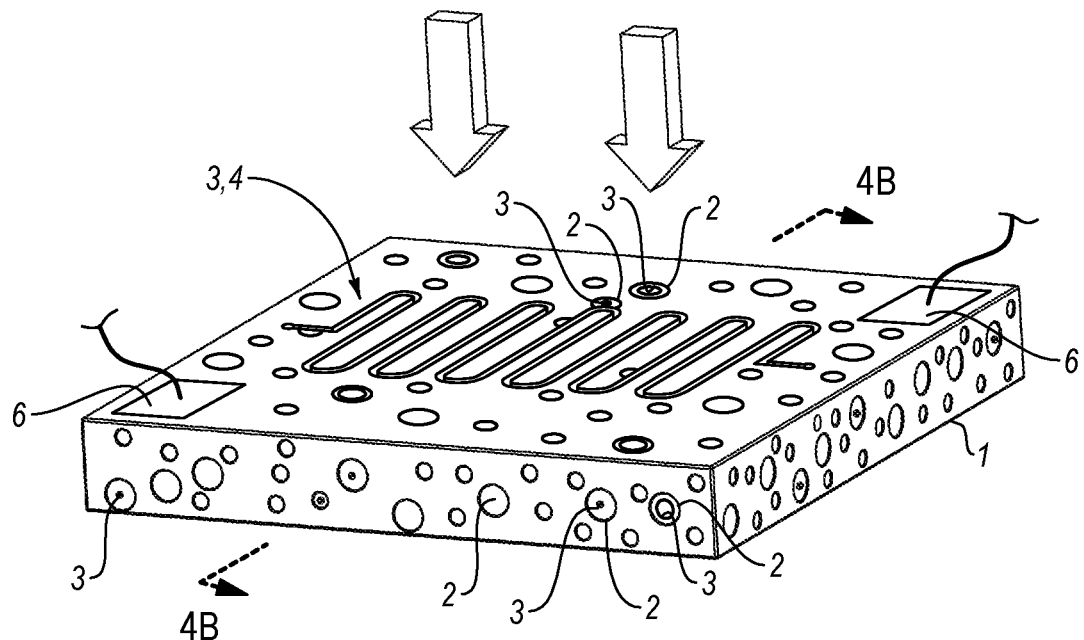
FIG. 4A is a drawing depicting a microreactor in accordance with some embodiments.
Figure 4B:
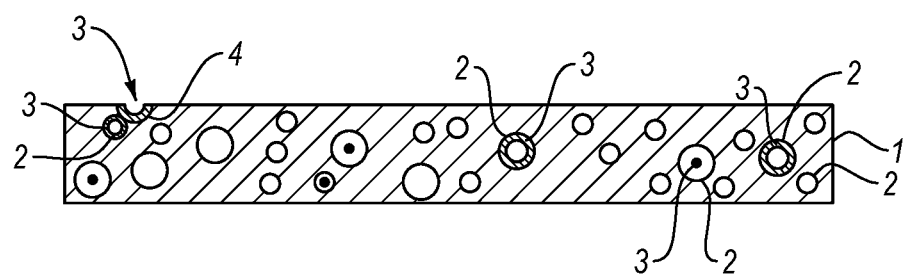
FIG. 4B is a cross-sectional view of the microreactor of FIG. 4A taken along the plane A-A in FIG. 4A.

FIGS. 4A and 4B are drawings of a silica-polyvinyl alcohol composite in accordance with some of the embodiments herein. FIGS. 4A and 4B include the composite 1, plurality of pores 2, catalyst 3, and flow path 4 shown in FIG. 1. In some embodiments, the flow path 4 (or other microstructure) is deep enough that a sufficient surface area of the flow path 4 is present in the final, sintered material, so that material in the pore 2 is effectively exposed as a surface in the flow path or other structure. Thus, as shown in FIG. 4B, in some embodiments, the flow path 4 is deeper than an average size of the pores 2. In some embodiments, one or more electrodes 6 can be added to the microreactor by adding the electrodes 6 to the pre-sintered composite. In some embodiments, the electrode 6 can be added by stamping a conductive material into the composite material 1.

Figure 5:
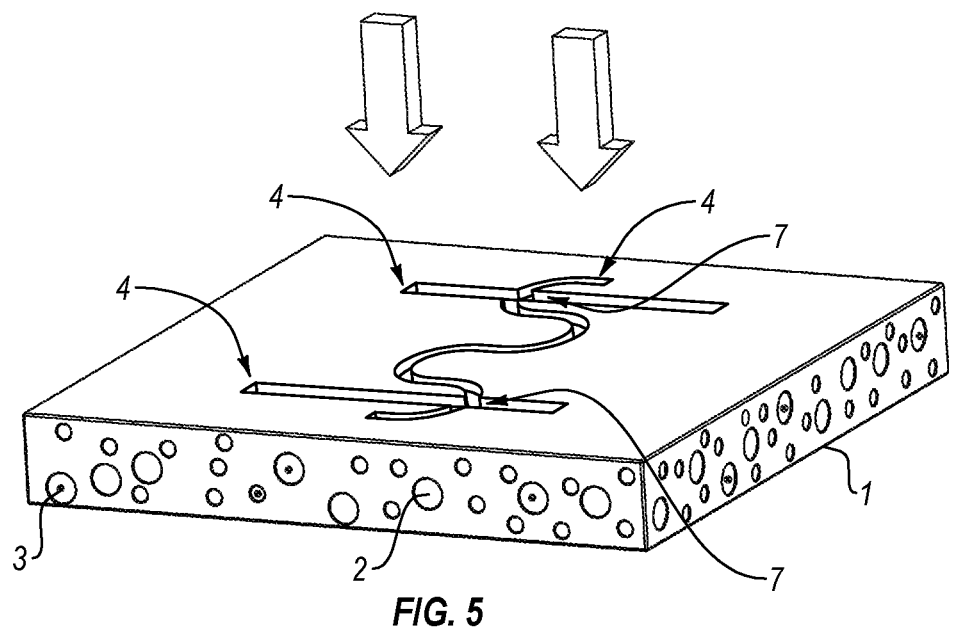
FIG. 5 is a drawing depicting a microreactor in accordance with some embodiments.

FIG. 5 is a drawing of a silica-polyvinyl alcohol composite in accordance with some of the embodiments herein. FIG. 5 includes the composite 1, plurality of pores 2, catalyst 3, and at least one flow path 4 shown in FIG. 1. In some embodiments, more than one flow path 4 is supplied in the microreactor (e.g., 2, 3, 4, 5, 6, 7, 8, 9, 10, 20, 40, 50, 60, 70, 80, 90, 100, 200, 300, 500, 1000, 10,000, 100,000, 1,000,000, or more flow paths 4 including any range above any one of the preceding values and any range between any two of the preceding values). In some embodiments, the one or more flow paths 4 can join together or split into additional flow paths at one or more junctions 7. In some embodiments, the flow paths 4 can be at least 1 nm wide (e.g., 1, 2, 5, 10, 20, 50, 100, 200, 300, 400, 500, 1,000, 2,000, 3,000, 4,000, 5,000, 6,000, 7,000, 8,000, 9,000, 10,000, 20,000, 30,000, 40,000, 50,000, 60,000, 70,000, 80,000, 90,000, 100,000, 200,000, 300,000, 400,000, 500,000, 600,000, 700,000, 800, 000, 900,000, or 1,000,000 nm wide, including any range above any one of the previous values and any range between any two of the previous values), and/or at least 1 nm deep, (e.g., 1, 2, 5, 10, 20, 50, 100, 200, 300, 400, 500, 1,000, 2,000, 3,000, 4,000, 5,000, 6,000, 7,000, 8,000, 9,000, 10,000, 20,000, 30,000, 40,000, 50,000, 60,000, 70,000, 80,000, 90,000, 100,000, 200,000, 300,000, 400,000, 500, 000, 600,000, 700,000, 800,000, 900,000, or 1,000,000 nm deep, including any range above any one of the previous values and any range between any two of the previous values). In some embodiments, the one of more flow paths 4 can be at least 1 nm in length, (e.g., 1, 2, 5, 10, 20, 50, 100, 200, 300, 400, 500, 1,000, 2,000, 3,000, 4,000, 5,000, 6,000, 7,000, 8,000, 9,000, 10,000, 20,000, 30,000, 40,000, 50,000, 60,000, 70,000, 80,000, 90,000, 100,000, 200,000, 300,000, 400,000, 500,000, 600,000, 700,000, 800,000, 900,000, 1,000,000, 2,000,000, 3,000,000, 4,000,000, 5,000,000, 6,000,000, 7,000,000, 8,000,000, 9,000,000, 10,000,000, 20,000,000, 30,000,000, 40,000,000, 50,000,000, 60,000, 000, 70,000,000, 80,000,000, 90,000,000, 100,000,000, 200, 000,000, 300,000,000, 400,000,000, 500,000,000, 600,000,000, 700,000,000, 800,000,000, 900,000,000, or 1,000,000,000 nm long, including any range above any one of the previous values and any range between any two of the previous values).

In some embodiments, the flow path 4 can be transparent or semi-transparent, either in the composite form and/or once the composite is sintered. In some embodiments, this is achieved when the silica material 1 is sintered, thereby allowing the material to exhibit transparency or semi-transparency so that the flow path 4 can exhibit transparency or semi-transparency. In some embodiments, the flow path 4 can provide the transparency for light detection of liquid/liquid reactions in a microreactor.

In some embodiments, the at least one catalyst in the microreactor and/or catalytic glass can include at least one transition metal. In some embodiments, the transition metal can include, but is not limited to, at least one of Rh, Pt, Ag, Jr, Au, Cu, or Zn. In some embodiments, at least some of the pores in the composite (before sintering) or glass (after sintering) can include at least some amount of a desired catalyst. In some embodiments, 1, 2, 3, 4, 5, 10, 20, 30, 40, 50, 60, 70, 80, 90, 95, 98, 99, or 100% of the pores include at least some amount of the catalyst, including any range below any one of the preceding values and any range between any two of the preceding values. In some embodiments, 1, 2, 3, 4, 5, 10, 20, 30, 40, 50, 60, 70, 80, 90, 95, 98, 99, or 100% of the pores on the surface of the material (either the composite or the sintered material) include at least some amount of the catalyst, including any range below any one of the preceding values and any range between any two of the preceding values. In some embodiments, at least one of the preceding percents of pores can contain some amount of the catalyst, e.g., at least some portion of the inner surface of the pore being coated (e.g. 0.1, 1, 2, 3, 4, 5, 6, 7, 8, 9, 10, 20, 30, 40, 50, 60, 70, 80, 90, 95, 98, 99, or 100% of the surface of the pore being coated, including any range below any one of the preceding values and any range between any two of the preceding values), to at least some percent of the volume of the pore being the catalyst (e.g., 0.001, 0.01, 0.1, 1, 2, 3, 4, 5, 6, 7, 8, 9, 10, 20, 30, 40, 50, 60, 70, 80, 90, 95, 98, 99, or 100% of the volume of the pore being occupied by the catalyst, including any range below any one of the preceding values and any range between any two of the preceding values).

In some embodiments, a silica-polyvinyl alcohol composite is provided and it includes at least one silica particle combined with polyvinyl alcohol ("PVA") so as to form a silica-polyvinyl alcohol composite. The composite can include a plurality of pores, which can optionally have an average diameter of about 1 nm to about 300 nm. The composite can include a catalyst. The catalyst can be on an outer surface of the silica-polyvinyl alcohol composite (or an outer surface of a product derived from the composite, such as a sintered composite). In some embodiments, the composite includes any of the herein described flow paths, and any of the catalysts can be a layer within and/or on top of the flow path or other microreactor structure. In some embodiments, the average diameter of the silica particles is below 100 nm. In some embodiments, the composite includes at least twice as much silica as polyvinyl alcohol, by weight, although any of the ranges provided herein are also applicable. In some embodiments, the weight ratio of silica to polyvinyl alcohol is about 80:20, although any of the ranges provided herein are also applicable. In some embodiments, a diameter of the at least one silica particle is about 1 nm to about 50 nm, although any of the ranges provided herein are also applicable. In some embodiments, the plurality of pores have the average diameter of about 2 nm to about 100 nm, although any of the ranges provided herein are also applicable. In some embodiments, the PVA-Silica composite can be formed using the method described in U.S. Pat. Publication 2012/0107589.

In some embodiments, the composite includes at least one silica particle combined with polyvinyl alcohol ("PVA") and a catalytic molecule to form a catalytic silica-polyvinyl alcohol composite. The composite can include a plurality of pores. In some embodiments, the composite can include at least as much silica as polyvinyl alcohol, by weight, e.g., 1:1, 2:1, 3:1, 4:1, 5:1, 6:1, 7:1, 8:1, 9:1, 10:1, or 100:1 including any range above any one of the preceding values and any range between any two of the preceding values.

In some embodiments, the composite 1 can include a plurality of pores 2 of relatively small sizes (e.g., on the nanoscale level). In some embodiments, the plurality of pores 2 can have an average diameter of about 2 nm to about 100 nm. In some embodiments, the plurality of pores 2 can have an average diameter of about 3 nm to about 30 nm. In some embodiments, the pores can have an average diameter of about 1 nm to about 500 nm, e.g., 1, 2, 3, 4, 5, 10, 20, 30, 40, 50, 60, 70, 80, 90, 100, 200, 300, 400, or 500 nm, including any range below any one of the preceding values and any range between any two of the preceding values. In some embodiments, the silica particle or particles can have an average diameter that is below 100 nm. In some embodiments, the average diameter of the at least one silica particle can be about 5 nm to about 50 nm. In some embodiments, the average diameter of the at least one silica particle can be about 3 nm to about 10 nm. In some embodiments, the average diameter of the at least one silica particle can be about 1 nm to about 50 nm. In some embodiments, the average diameter of the at least one silica particle can be about 7 nm. In some embodiments, the average diameter of the silica particles can be below 200 nm, e.g., 200, 190, 180, 150, 100, 90, 80, 70, 60, 50, 40, 30, 20, 10 or 1 nm, including any range below any one of the preceding values and any range between any two of the preceding values.

In some embodiments, the composite 1 can include a silica structure. The silica structure can include silica and at least one pore 2 with an average diameter of about 1 nm to about 100 nm.

There are a variety of ways in which a catalytic molecule can be applied to a composite material and/or porous silica structure. In some embodiments, the method of manufacturing a porous catalytic glass can include providing a silicon dioxide-polyvinyl alcohol composite, forming a flow path in the composite, applying a catalyst to the flow path, and heating the silicon dioxide-polyvinyl alcohol composite to yield a porous catalytic glass. In some embodiments, providing a silicon dioxide-polyvinyl alcohol composite includes providing a silicon dioxide suspension including particles of silicon dioxide, adding polyvinyl alcohol to the silicon dioxide suspension to create a mixture, and drying the mixture to provide the silicon dioxide-polyvinyl alcohol composite. In some embodiments, drying the mixture involves drying at a temperature of about 25° C. to about 35° C. In some embodiments, forming a flow path includes stamping a flow path into the composite. In some embodiments, applying the catalyst includes stamping the flow path into the composite. The surface of the stamp can be coated with a catalyst such that when the stamp is contacted to the composite, at least some of the catalyst is transferred to the composite. Thus, in some embodiments, the stamping can both apply the catalyst and provide a structural aspect to the composite material, allowing for a faster process of making such a microreactor by removing what had previously been separate steps. In other embodiments, the catalyst can be applied before the composite is formed and/or after the structure is applied.

Figure 2:
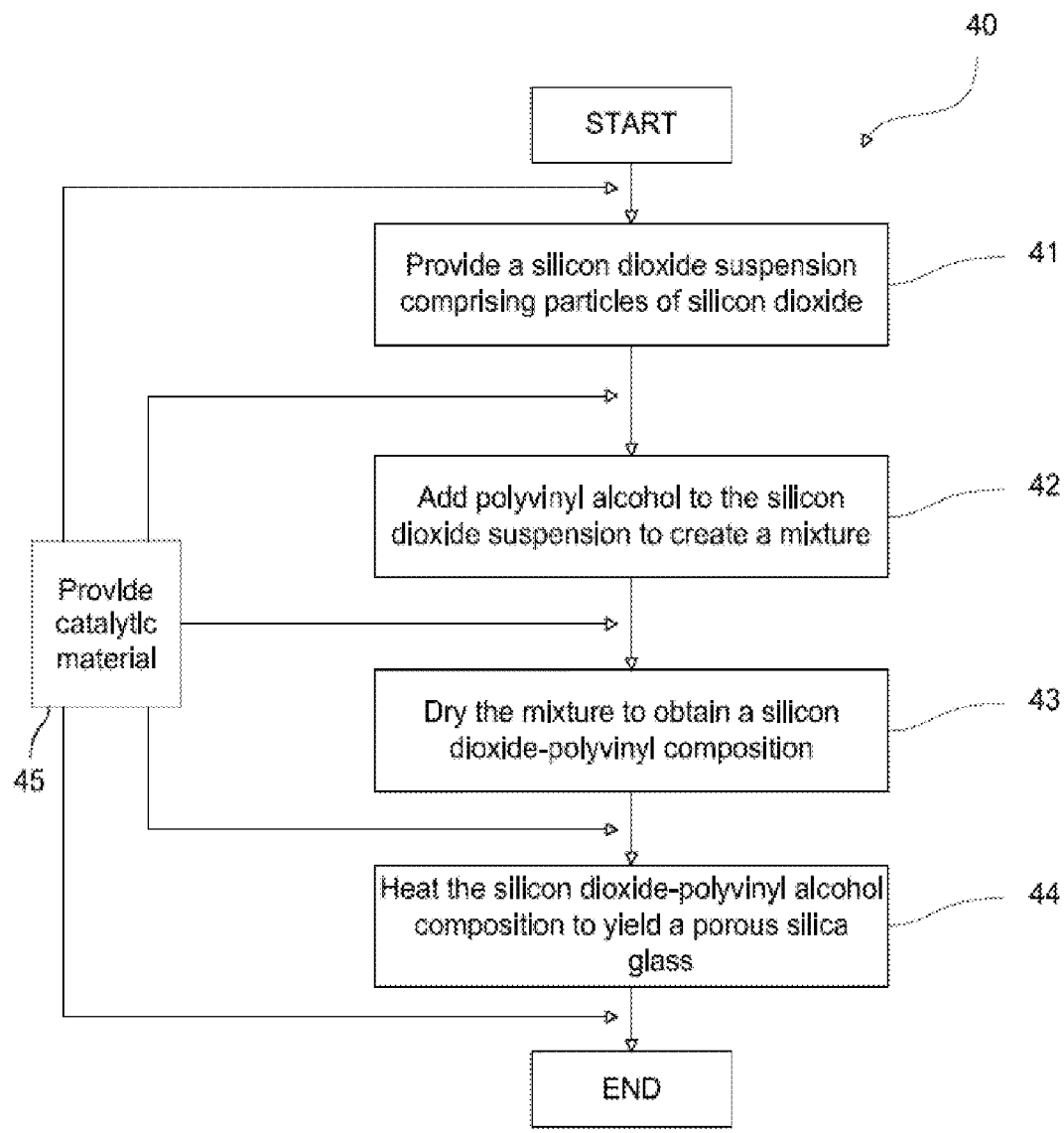
FIG. 2 is a flow chart of various embodiments of methods of manufacturing a porous catalytic glass. In some embodiments, the catalytic material can be applied at any of one or more parts of the process.

FIG. 2 is a flow diagram of an illustrative embodiment of a method of manufacturing a porous catalytic material. In some embodiments, the process 40 can include providing a silicon dioxide suspension that can include particles of silicon dioxide (block 41). In some embodiments, the process 40 further involves adding polyvinyl alcohol to the silicon dioxide suspension to create a mixture (block 42). In some embodiments, the process 40 further involves drying the mixture to obtain a silicon-dioxide polyvinyl alcohol composite (block 43). In some embodiments, the process 40 additionally includes heating the silicon dioxide-polyvinyl alcohol composite to yield a porous glass (block 44). As is shown in FIG. 2, one can provide the catalytic material (block 45) at any one or more of a number of different stages. In some embodiments, the catalytic material can be provided initially or to the silicon dioxide suspension and/or polyvinyl alcohol suspension. Such an application can result in a distribution of the catalytic material throughout the composite and/or material. In some embodiments, one can apply the catalytic material (block 45) to the mixture before it is dry or fully dried, or once it has dried (block 43), allowing for some degree of diffusion of the catalytic material into the mixture (depending upon the moisture present in the composite and/or mixture). In some embodiments, one can apply the catalytic material to the composition (block 43) via a mold and/or stamping process (for example, underneath the stamp). In some embodiments, the catalytic material can be applied to the heated porous glass product, for example, either as a stamp or as a surface treatment to the porous surface.

In some embodiments, the method of manufacturing the porous glass can further include shaping the silicon dioxide-polyvinyl alcohol composite (generally during and/or after block 43) into a desired shape, prior the heating process that yields the porous glass (the sintering process). In this pre-sintered state, the silicon dioxide-polyvinyl alcohol composite can be sufficient flexibility to be moldable into the desired shape.

In some embodiments, prior to sintering, one allows the silicon dioxide-polyvinyl alcohol composite to dry to at least some extent.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In some embodiments, the method of manufacturing the silica-polyvinyl alcohol composite can further include adjusting the pH of the mixture during the process so that it stays between 2 and 4. In some embodiments, combining the polyvinyl alcohol aqueous solution with the silicon dioxide particles can include stirring the mixture at about room temperature. In some embodiments, the mixture can be stirred with a magnetic stirrer for 2, 3, 5, 8, 10, 12, 15, 20, or 24 hours (including any range beneath any one of the preceding values and any range defined between any two of the preceding values). In some embodiments, the mixture can be stirred at 200, 300, 500, 800, 1000, 1200, or 1500 rpm, including any range beneath any one of the preceding values and any range defined between any two of the preceding values. For example, in some embodiments, the mixture can be stirred with a magnetic stirrer for 12 hours at 800 rpm. In some embodiments, drying the mixture can include subjecting the mixture to 10° C., 15° C., 25° C., 30° C., 35° C., 45° C., 55° C., 65° C., 75° C., or room temperature in air (including any range beneath any one of the preceding values and any range defined between any two of the preceding values). For example, drying the mixture can include drying the mixture at 30° C. in air. In some embodiments, the composite can be dried adequately so that the composite can be manipulated as desired (such as a pattern stamped into it and an adequate shape retained until the shape of the structure can be fixed by sintering). In some embodiments, the composite can be dried for 0.1, 0.5, 1, 2, 3, 4, 5, 6, 7, 8, 9, 10, 12, or 24 hours, including any range below any of the preceding values and any range defined between any two of the preceding values.

Figure 3:
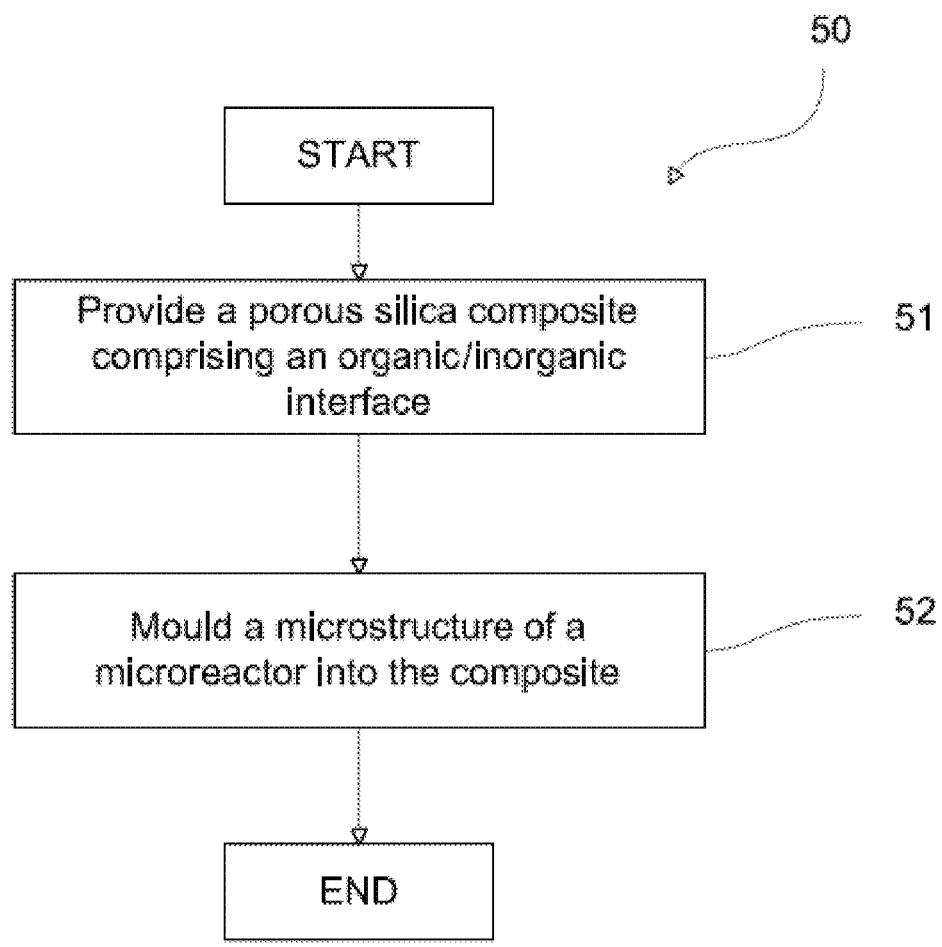
FIG. 3 is a flow chart of some embodiments of methods of manufacturing a microreactor. The catalytic material can be applied at any point in the process.

FIG. 3 is a flow diagram of an illustrative embodiment of a method of manufacturing a microreactor. In some embodiments, the process 50 can include providing a porous silica composite that can include an organic/inorganic interface (block 51). In some embodiments, the process 50 can further include molding a microstructure of a microreactor into the composite (block 52). In some embodiments, the porous silica composite is dried at least partially, just prior to molding, e.g., 1, 2, 5, 10, 15, 20, 30, 40, 50, 60, 70, 80 90, 95, or 99% of the moisture can be removed (including any range above any one of the preceding values and any range between any two of the preceding values). In some embodiments, this moisture removal is performed after stamping and/or molding, and/or during stamping and/or molding. In some embodiments, the microreactor can be the microreactor described earlier herein with reference to FIG. 1 and/or any microreactor with a flow path therein.

In some embodiments, the method of manufacturing a microreactor includes providing a porous silica composite including an organic/inorganic interface, and molding a microstructure of a microreactor into the composite. In some embodiments, the composite includes polyvinyl alcohol. In some embodiments, the molding includes stamping the microstructure of the microreactor into the nanocomposite. In some embodiments, one further adds the catalyst to the composite. In some embodiments, one further forms a flow path in the composite. In some embodiments, one can further apply the catalyst in the composite, such that forming the flow path is performed concurrently with applying the catalyst (for example, by stamping the shape of the flow path into the composite with a stamp that is coated with a catalyst. In some embodiments, molding the microstructure involves applying a pressure of about 1 MPa to about 10 MPa, which can be done for about one minute. One can then heat the material to produce a transparent glass.

In some embodiments, the composite can include polyvinyl alcohol before the material is sintered. The polyvinyl alcohol with silica can provide flexibility to the composite so that the composite can be molded to have a microstructure. The microstructure can include various projections and recesses stamped onto the composite. One of skill in the art will appreciate that any number of configurations for the microstructure can be employed. An example of a microstructure of a microreactor is illustrated in FIG. 1. In some embodiments the stamped and/or molded microstructure can be a structure other than and/or in addition to a flow path, e.g., a chamber, a well, various walls, ramps, curves, pits, dots, pillars, junctions, etc. In some embodiments, the stamped and/or molded microstructure can be three-dimensional versions of the above, and/or multi stage products, spirals, etc. In some embodiments, the flow path can be configured in the composite material to support multiple reactions in series and/or parallel.

In some embodiments, the method of manufacturing the microreactor can further include adding a catalyst to the composite and/or the sintered product. The catalyst can be at least of one Rh, Pt, Ag, Jr, Au, Cu, Zn, and/or other transition metals. In some embodiments, the catalyst can be chemically and thermally stable at a sintering temperature of 1000° C. or above. In some embodiments, the catalyst is not chemically and/or thermally stable at a sintering temperature of 1000° C. or above. In some embodiments, the catalyst can include a metallocyclic material. This can be in combination with one or more of the materials noted above. In some embodiments, the catalyst can include tungsten and/or molybdenum (for example, it can include a combination of the two).

In some embodiments, the method of manufacturing the microreactor (or other structure or substrate) can further include fixing the catalyst in the composite. In some embodiments, fixing the catalyst can include adsorbing the catalyst into one or more pores in the composite. In some embodiments, fixing the catalyst in the composite and forming the flow path is performed concurrently. In some embodiments, fixing the catalyst and forming the flow path concurrently can be achieved at a relatively low temperature, such as 10° C., 15° C., 25° C., 30° C., 35° C., 45° C., or room temperature, including any range above any of any of the preceding values, any range below any of the preceding values and any range between any two of the preceding values. It is possible to fix the catalyst in the composite and form the flow path concurrently by a room-temperature imprinting technology, such as stamping as described earlier herein. In some embodiments, fixing the catalyst in the composite occurs first and forming the flow path occurs later. In some embodiments, fixing the catalyst in the composite occurs after the flow path is formed. In some embodiments, the catalyst can be added while the material is still in its composite form (e.g., in the presence of at least some amount of polyvinyl alcohol). In some embodiments, the ratio of catalyst to $SiO_2$, by weight, can be 1:10, 1:100, 1:1000, 1:10000, 1:50,000, 1:100,000, or 1:1,000,000, including any range beneath any one of the preceding values and any range between any two of these values.

In some embodiments, molding the microstructure can include applying a pressure of about 0.1 MPa to about 100 MPa, e.g., 0.1, 1, 10, 20, 30, 40, 50, 60, 70, 80, 90, or 100 Mpa, including any range defined between any two of these values and any range above any one of these values. In some embodiments, the pressure can be applied for a sufficient amount of time to create the desired structure and/or shape, e.g., about 1 second, 10 seconds, 30 seconds, 45 seconds, 1 minute, 2 minutes, 3 minutes, 5 minutes 10 minutes or more, including any range defined between any two of these values and any range above any one of these values.

In some embodiments, the method of manufacturing the microreactor can further include heating the composite to produce a transparent glass. For example, heating the composite can include heating the composite from room temperature to an adequate temperature, e.g., 500, 600, 700, 800, or 900° C. or more. In some embodiments, one transitions from the temperature at which the molding occurred (e.g., around room temperature) to the heating and/or drying temperature at a desired rate so as to avoid issues of drying and/or rapid vapor formation. In some embodiments, the rate of increase can be from 1 to 10° C./minute, e.g., 1, 2, 3, 4, 5, 6, 7, 8, 9 or 10° C./minute. In some embodiments, there can be two phases of heating. In some embodiments, the first occurs at a temperature range from 300 to 900° C. for 30 minutes to 24 hours (e.g., room temperature, 40, 50, 60, 70, 100, 200, 300, 400, 500, 600, 700, 800, 900° C. over 0.5, 1, 2, 3, 4, 5, 6, 7, 8, 9, 10, 11, 12, 13, 14, 15, 16, 17, 18, 19, 20, 21, 22, 23, or 24 hours, including any range between any two of the temperatures and any two of the hours and any range above any one of the temperatures and one of the listed hours. In some embodiments, a sintering process can be performed to yield a silica substrate. In some embodiments this phase of heating occurs at a temperature range from room temperature to 1700° C. for 30 minutes to 24 hours (e.g., 30, 40, 50, 60, 70, 100, 200, 300, 400, 500, 600, 700, 800, 900, 1000, 1100, 1200, 1300, 1400, 1500, 1600, or 1700° C. over 0.5, 1, 2, 3, 4, 5, 6, 7, 8, 9, 10, 11, 12, 13, 14, 15, 16, 17, 18, 19, 20, 21, 22, 23, or 24 hours including any range between any two of the temperatures and any two of the hours and any range above any one of the temperatures and one of the listed hours). In some embodiments, the sintering takes place in air. In some embodiments, the sintering takes place in a different atmospheric environment. In some embodiments, the sintering takes place under an inert environment, and can be, for example under a noble gas. In some embodiments, the nanocomposite material can exhibit transparency when sintered at or above 1000° C. Thus, in some embodiments, the substrate and/or microstructure can be transparent. In some embodiments, the transparency can be from the vacuum ultraviolet range to the infrared range. In some embodiments, this is a desirable aspect for a microreactor, allowing for light detection and/or reactions to occur in the microreactor. In some embodiments, a sintering temperature of less than 1000° C. can be used, which, in some embodiments, can provide different optical properties for the provided substrate.

In some embodiments, once the material is stamped with the desired structure it can then be subjected to heat treatment at 600° C. for about three hours, then a heating process raising the temperature from 600° C. to 1100° C., and then the material can be subjected to a heat treatment of 1100° C. for about three hours. The transparent glass produced as a result of this heat treatment can have the microreactor microstructure on its surface.

In some embodiments, the methods provided herein allow one to use a silica composite and form a flow path and fix a catalyst concurrently, for example, in a single step, for example, by stamping. In some embodiments, the process of forming a microreactor provided herein allows one to avoid photolithography, etching via a plasma, and/or the combination of the two. In some embodiments, the processes provided herein allow one to form a microreactor or other structure without high temperature thermal imprinting. Thus, in some embodiments, one can perform the imprinting at less than 1700° C., for example, 1600, 1500, 1400, 1300, 1200, 1100, 1000, 900, 800, 700, 600, 500, 400, 300, 200, 100° C., room temperature or less, including any range below any one of the preceding values and any range between any two of the preceding values.

EXAMPLES

Example 1

Method of Making a Porous Silica Structure Having a Catalytic Material

The porous silica substrate can be prepared as generally outlined in U.S. Pat. Pub. 2012/0107589. A polyvinyl alcohol solution is added to a SiO$_2$ suspension of fumed silica having an average primary particle diameter of 7 nm to give a SiO$_2$:polyvinyl alcohol weight ratio of 80:20. The pH is adjusted 3.5 and the solution is stirred with a magnetic stirrer for 12 hours at 800 rpm in air at room temperature, yielding a SiO$_2$— polyvinyl alcohol aqueous solution. This is then put into a desired mold and will be dried at 30 degrees Centigrade in air to yield a SiO$_2$— polyvinyl alcohol nanocomposite. The nanocomposite has pores on the order of several nanometers to several tens of nanometers. A transition metal catalyst including Zinc is added to the nanocomposite material prior to the application of a sintering level of heat, so as to allow the catalytic material to be present in the pores of the final glass structure.

Example 2

Method of Making a Porous Silica Microreactor

A polyvinyl alcohol solution is added to a SiO$_2$ suspension of fumed silica having an average primary particle diameter of 10 nm to give a SiO$_2$:polyvinyl alcohol weight ratio of 80:20. The pH is adjusted 3 and the solution is stirred with a magnetic stirrer for 10 hours at 800 rpm in air at room temperature, yielding a SiO$_2$— polyvinyl alcohol aqueous solution.

The nanocomposite material is dried at 30 degrees Centigrade to form a composite material that is moldable.

A mold configured for providing a flow path for a microreactor is then used to create a flow path in the composite material by applying a pressure of 5 Mpa for one minute at room temperature. Prior to the application of the mold, a solution containing Zn particles is applied to a surface of the mold, thereby allowing for both the creation of the flow path, as well as the transfer of the catalytic material to a surface of the flow path in the composite, at the same time by the stamping process.

The stamped material can then be heated to 600 degrees Centigrade (moving up from room temperature at a rate of 5 degrees Centigrade per minute), for three hours. The material is then heated at 1100 degrees Centigrade for three hours, thereby providing a transparent glass having the microreactor structure stamped on it, with a catalyst in the pores of the surface of the microstructure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, compounds, composites or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A microreactor comprising:
   a sintered silica body formed from a sintered silica material;

a channel formed in an exterior surface of the sintered silica body, the channel extending into the sintered silica body a depth from the exterior surface, and a width and length across the sintered silica body, wherein the channel defines a flow path across the exterior surface of the sintered silica body;

a plurality of pores in the sintered silica material that extend internally through at least a portion of the sintered silica body, wherein at least one pore of the plurality of pores has an average diameter of about 1 nm to about 100 nm, and wherein the at least one pore is in fluid communication with the channel; and at least one catalyst on an internal surface of the at least one pore, wherein the catalyst on the internal surface of the at least one pore is in fluid communication with the channel within the sintered silica body.

2. The microreactor of claim 1, wherein the channel is transparent or semi-transparent.

3. The microreactor of claim 2, wherein the channel is optically transparent under vacuumed ultraviolet to infrared range.

4. The microreactor of claim 1, wherein the at least one catalyst comprises at least one transition metal.

5. The microreactor of claim 4, wherein the at least one transition metal comprises at least one of Rh, Pt, Ag, Ir, Au, Cu, or Zn.

6. The microreactor of claim 1, wherein the at least one catalyst is adsorbed onto the internal surface in the at least one pore.

7. The microreactor of claim 1, wherein the at least one catalyst comprises an organic catalyst.

8. The microreactor of claim 1, wherein the at least one catalyst is in a continuous layer over part or substantially all of a surface of the channel.

9. The microreactor of claim 1, wherein the depth of the channel into the exterior surface of the sintered material is greater than an average diameter of the at least one pore.

10. The microreactor of claim 1, comprising one or more electrodes.

11. The microreactor of claim 10, wherein the one or more electrodes comprise a conductive material stamped onto the sintered silica material.

12. The microreactor of claim 1, wherein the microreactor comprises a plurality of channels, wherein two or more channels join together at one or more junction(s).

* * * * *

UNITED STATES PATENT AND TRADEMARK OFFICE
CERTIFICATE OF CORRECTION

Page 1 of 1

PATENT NO. : 9,610,575 B2
APPLICATION NO. : 13/880034
DATED : April 4, 2017
INVENTOR(S) : Fujino It is certified that error appears in the above-identified patent and that said Letters Patent is hereby corrected as shown below:

On the Title Page

In Item (54), in "Title", in Column 1, Line 1, delete "SUBSTRATE" and insert -- SUBSTRATES --, therefor.

In the Specification

In Column 1, Line 1, delete "SUBSTRATE" and insert -- SUBSTRATES --, therefor.

In Column 5, Line 19, delete "Jr," and insert -- Ir, --, therefor.

In Column 9, Line 9, delete "Jr," and insert -- Ir, --, therefor.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*